United States Patent
Watanabe et al.

(10) Patent No.: US 8,095,258 B2
(45) Date of Patent: Jan. 10, 2012

(54) VEHICLE POWERTRAIN, CONTROLLER THEREOF, AND METHOD FOR CONTROLLING VEHICLE POWERTRAIN

(75) Inventors: Hideto Watanabe, Toyota (JP); Yasuo Shimizu, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 574 days.

(21) Appl. No.: 12/299,795

(22) PCT Filed: May 10, 2007

(86) PCT No.: PCT/IB2007/001209
§ 371 (c)(1),
(2), (4) Date: Nov. 6, 2008

(87) PCT Pub. No.: WO2007/138401
PCT Pub. Date: Dec. 6, 2007

(65) Prior Publication Data
US 2009/0182466 A1 Jul. 16, 2009

(30) Foreign Application Priority Data
May 24, 2006 (JP) ................................. 2006-143649

(51) Int. Cl.
*G01M 17/00* (2006.01)
*G06F 19/00* (2011.01)
*G06F 17/00* (2006.01)
(52) U.S. Cl. .......................................... 701/29; 701/54
(58) Field of Classification Search .................... 701/29, 701/69, 99; 123/406.11, 406.18, 406.58
See application file for complete search history.

(56) References Cited

U.S. PATENT DOCUMENTS

| | | | | |
|---|---|---|---|---|
| 3,886,810 A | * | 6/1975 | Sugiyama et al. | 477/41 |
| 4,262,552 A | * | 4/1981 | Honda | 192/104 B |
| 4,282,947 A | | 8/1981 | Kemper | |
| 4,721,083 A | * | 1/1988 | Hosaka | 477/111 |
| 6,024,667 A | * | 2/2000 | Krohm et al. | 477/6 |
| 2004/0034460 A1 | * | 2/2004 | Folkerts et al. | 701/54 |

FOREIGN PATENT DOCUMENTS

| | | |
|---|---|---|
| DE | 28 23 225 A1 | 11/1979 |
| EP | 1 291 552 A | 3/2003 |
| JP | 49-51428 A | 5/1974 |
| JP | 51-117246 A | 10/1976 |
| JP | 58-86447 U1 | 6/1983 |
| JP | 59-125636 U1 | 8/1984 |
| JP | 03-168343 A | 7/1991 |
| JP | 05-157141 A | 6/1993 |
| JP | 05-288110 A | 11/1993 |
| JP | 2003-074641 A | 3/2003 |
| JP | 2006-022890 A | 1/2006 |

* cited by examiner

*Primary Examiner* — James Trammell
*Assistant Examiner* — Michael D Lang
(74) *Attorney, Agent, or Firm* — Kenyon & Kenyon LLP

(57) ABSTRACT

When a hybrid ECU determines that a malfunction in which a moment-adding flywheel cannot be connected to an engine occurs, an engine ECU controls a rotational speed of the engine to a value higher than that in a normal operation. Further, when the hybrid ECU determines that a malfunction in which the moment-adding flywheel cannot be disconnected from the engine occurs, a control is executed so that a ratio of a torque of a first motor to a torque of the engine is higher than that in the normal operation.

8 Claims, 2 Drawing Sheets

US 8,095,258 B2

VEHICLE POWERTRAIN, CONTROLLER THEREOF, AND METHOD FOR CONTROLLING VEHICLE POWERTRAIN

This is a 371 national phase application of PCT/IB2007/001209 filed 10 May 2007, claiming priority to Japanese Patent Application No. 2006-143649 filed 24 May 2006, the contents of which are incorporated herein by reference.

BACKGROUND OF THE INVENTION

1. Field of the Invention

The invention relates to a vehicle powertrain that includes a flywheel which is connected to and disconnected from an output shaft of an engine. In particular, the invention relates to a control executed when a malfunction with respect to at least either of connection or disconnection of the flywheel occurs.

2. Description of the Related Art

In general, a flywheel is attached to a crankshaft of an engine that functions as an output shaft of the engine, in order to reduce fluctuation in rotation of the engine. If the moment of inertia of the flywheel is made larger, the fluctuation in rotation of the engine is reduced. In particular, the effect of reducing the fluctuation is significant when the engine is idling or operated at low rotational speed. On the other hand, when the vehicle is accelerated while the moment of inertia of the flywheel is large, rotational energy produced by the engine is consumed in order to accelerate rotation of the flywheel, thus deteriorating the acceleration performance of the vehicle. In addition, when the vehicle is decelerated, an engine brake does not fully work due to the rotational energy stored in the flywheel.

A flywheel whose moment of inertia can be changed has been proposed in order to reduce the fluctuation in rotation of the engine when the vehicle is traveling at low speed (the engine is operated at low rotational speed), and improve the acceleration response of the vehicle. Japanese Patent Application Publication No. 2003-074641 (No. JP-A-074641) describes a technology in which the engine is provided with a first flywheel attached to a crankshaft of the engine and a second flywheel connected to and disconnected from the first flywheel. In the technology, when the engine is idling, the second flywheel is connected to the first flywheel so as to increase the moment of inertia of the first flywheel attached to the crankshaft. Further, when the vehicle is accelerated, the second flywheel is disconnected from the first flywheel so as to reduce the moment of inertia of the first flywheel.

In the aforementioned Japanese Patent Application Publication No. 2003-074641 (JP-A-2003-074641), there is no description with respect to a control executed when a malfunction occurs, for example, when a malfunction, in which the second flywheel cannot be connected to or disconnected from the first flywheel, occurs. When such a malfunction occurs, the moment of inertia generated in the rotational system of the engine deviates from the assumed value, and therefore the desired engine performance may not be achieved.

SUMMARY OF THE INVENTION

The invention provides a control of a powertrain in accordance with a condition of a malfunction of a flywheel which is connected to or disconnected from the output shaft of an engine when the malfunction of the flywheel occurs.

A first aspect of the invention relates to a vehicle powertrain including: an engine that drives the vehicle; a flywheel that is selectively switched between a state where the flywheel is connected to an output shaft of the engine and a state where the flywheel is disconnected from the output shaft of the engine; and a control portion that controls the engine. The vehicle powertrain is characterized in that it is determined whether a malfunction of the flywheel occurs, and if it is determined that the malfunction of the flywheel occurs, the engine is controlled in accordance with a condition of the malfunction.

In the aforementioned vehicle powertrain, when a malfunction in which the flywheel is not connected to the output shaft of the engine occurs, the control portion may control the rotational speed of the engine to a value higher than the rotational speed in a normal operation.

In the aforementioned vehicle powertrain, the control portion controls the engine so that an output from the engine equals to an output from the engine in the normal operation.

The aforementioned vehicle powertrain may further include a motor that drives the vehicle. The control portion may control the motor. The control portion may control the engine and the motor so that a ratio between a torque of the engine and a torque of the motor is a predetermined value in order to produce a required driving force for driving the vehicle. The control portion may control the engine and the motor so that a ratio of the torque of the motor to the torque of the engine is higher than that in the normal operation, when a malfunction in which the flywheel is not disconnected from the output shaft of the engine occurs.

A second aspect of the invention relates to a control apparatus for a vehicle powertrain including: an engine that drives a vehicle; and a flywheel that is selectively switched between a state where the flywheel is connected to an output shaft of the engine and a state where the flywheel is disconnected from the output shaft of the engine. The control apparatus for the vehicle power train is characterized by including: a malfunction determining portion that determines whether a malfunction of the flywheel occurs; and an engine control portion that controls the engine in accordance with a condition of the malfunction when the malfunction determining portion determines that the malfunction of the flywheel occurs.

A third aspect of the invention relates to a method for controlling a vehicle powertrain including: an engine that drives a vehicle; and a flywheel that is selectively switched between a state where the flywheel is connected to an output shaft of the engine and a state where the flywheel is disconnected from the output shaft of the engine. The method for controlling the vehicle powertrain is characterized by including the steps of: determining whether a malfunction of the flywheel occurs; and controlling the engine in accordance with a condition of the malfunction when it is determined that the malfunction of the flywheel occurs.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EXAMPLE EMBODIMENTS

Figure 1:
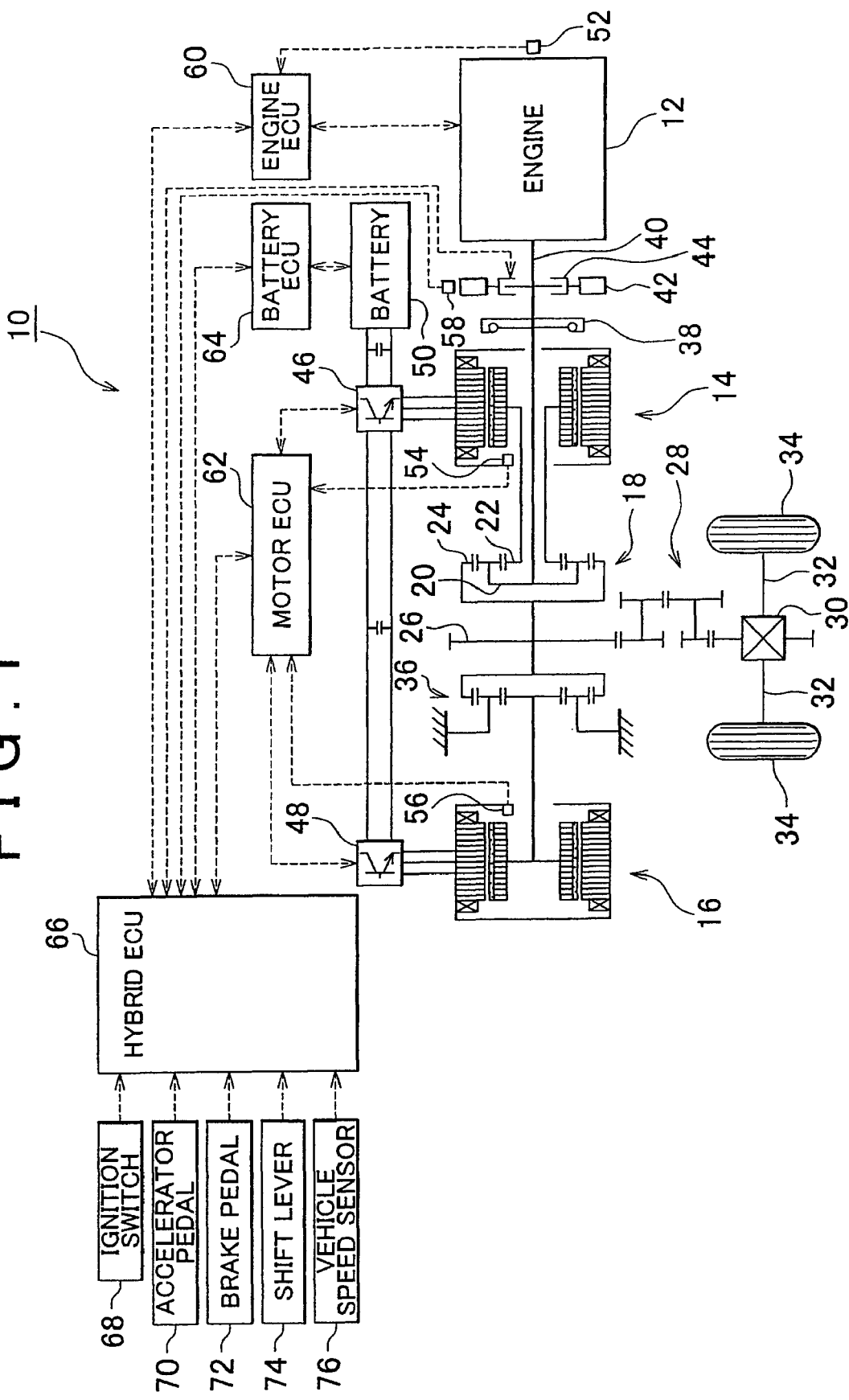
FIG. 1 is a view schematically showing a construction of a powertrain according to an embodiment.

An example embodiment of the invention will be described with reference to the drawings. FIG. 1 schematically shows a construction of a powertrain 10 of a hybrid vehicle according to the embodiment. The powertrain 10 includes an engine 12, and first and second motors 14, 16 that generate electric power. The engine 12 and the first and second motors 14, 16 function as prime movers to drive the vehicle. The engine 12 and the first and second motors 14, 16 are connected to three elements of a planetary gear mechanism, respectively, and the planetary gear mechanism constitutes a power splitting/combining mechanism 18. That is, the engine 12 is connected to a planetary carrier 20 of the planetary gear mechanism, the first motor 14 is connected to a sun gear 22, and the second motor 16 is connected to a ring gear 24. Further, an output gear 26 is connected to the ring gear 24. The power generated by combining all the outputs from the engine 12 and the motors 14, 16 is transmitted from the output gear 26 to driving wheels 34 through a speed reducing gear train 28, a differential unit 30, and a drive shaft 32.

The powertrain 10 is provided with the power splitting/combining mechanism 18, and drives the vehicle using the engine 12 and/or the second motor 16 by controlling the rotational speeds and the output torques of the engine 12 and the first and second motors 14, 16. The engine 12 drives the first motor 14 to generate electric power. Further, the powertrain 10 can be operated in various modes. For example, the second motor 16 regenerates power using the rotational force transmitted from the driving wheels 34 rotated by inertia of the vehicle.

The first motor 14 and the sun gear 22 are directly connected to each other through an output shaft of the first motor 14. The second motor 16 is connected to the ring gear 24 through a reduction mechanism 36. A planetary gear mechanism may be employed in the reduction mechanism 36, and in this case, an output shaft of the second motor 16 is connected to a sun gear, and the ring gear 24 of the power splitting/combining mechanism 18 is connected to a ring gear of the planetary gear mechanism. Since a planetary carrier of the reduction mechanism 36 is fixed to the reduction mechanism 36, the planetary carrier cannot rotate. In this way, the rotation of the second motor 16 is decelerated, and the reduced rotation is transmitted to the output gear 26.

The engine 12 and the planetary carrier 20 are connected to each other through a torsional damper 38. A flywheel 42 is provided on an engine output shaft 40 through a clutch 44 at a position between the engine 12 and the torsional damper 38. The flywheel 42 differs from a conventional flywheel that is fixed on a crankshaft of an engine and integrally rotates with the crankshaft when the crankshaft rotates. In order to distinguish the flywheel 42 from the conventional flywheel, the flywheel 42 will be hereinafter referred to as a moment-adding flywheel 42. The moment-adding flywheel 42 may be constructed such that a clutch is provided between a commonly-used flywheel and the crankshaft, and the clutch is engaged with or disengaged from the crankshaft to connect/disconnect the flywheel to/from the engine output shaft.

The clutch 44 is engaged and disengaged so that the moment-adding flywheel 42 is connected to and disconnected from the engine output shaft 40. When the engine 12 is rotating, the clutch 44 is engaged to connect the moment-adding flywheel 42 to the engine output shaft 40 so that the moment-adding flywheel 42 is rotated by the prime mover (e.g. the engine 12) or inertia of the vehicle. In this way, the moment-adding flywheel 42 functions as storage of the rotational energy. When the rotational speed of the engine 12 is below a predetermined value, or the engine is going to be stopped, the clutch 44 is disengaged to keep the moment-adding flywheel 42 rotating. The rotational energy stored in the moment-adding flywheel 42 is used for restarting the engine 12. That is, the clutch 44 is engaged to rotate the engine output shaft 40 so as to restart the engine 12. At this time, the first motor 14 may also be used for rotating the engine 12.

When the moment-adding flywheel 42 is connected to the engine output shaft 40, the moment of inertia in the rotational system of the engine 12 increases, and fluctuation in rotation of the engine 12 decreases, thus contributing to reducing vibration noise of the engine 12. When the moment-adding flywheel 42 is disconnected from the engine output shaft 40, the moment of inertia of the engine 12 is decreased, thus contributing to improving a response to, for example, accelerate the engine 12.

The first and second motors 14, 16 are connected to a battery 50 through a first and a second inverters 46, 48, respectively. The electric power stored in the battery 50 is converted to AC power by the first and second inverters 46, 48, and the AC power is supplied to the first and second motors 14, 16, respectively, to drive the first and second motors 14, 16. The electric power generated by the first and second motors 14, 16 is converted to DC power or ripple-current power by the first and second inverters 46, 48 and the DC power or ripple-current power is supplied to the battery 50. The battery 50 stores the electric power supplied.

The engine 12, the first and second motors 14, 16, and the moment-adding flywheel 42 are provided with rotational speed sensors 52, 54, 56, 58, respectively. The rotational speed sensors 52, 54, 56, 58 detect the respective rotational speeds of the engine 12, the first and second motors 14, 16, and the moment-adding flywheel 42. The rotational speed sensor 52 of the engine 12 sends out a signal indicative of the rotational speed of the engine 12 to an engine electric control unit (hereinafter, "engine ECU") 60. The engine ECU 60 controls the rotational speed and output torque of the engine 12 based on the signal and other signals relating to the engine control sent to the engine ECU 60. The rotational speed sensors 54, 56 of the first and second motors 14, 16 send out respective signals indicative of the rotational speeds of the first and second motors 14, 16 to a motor electric control unit ("motor ECU") 62. The motor ECU 62 controls the rotational speeds and output torques of the first and second motors 14, 16 based on the signals sent, and the like. Further, the powertrain 10 is provided with a battery electric control unit ("battery ECU") 64 that controls the amount of power stored, and the like of the battery 50. The ECUs 60, 62, 64 are connected to a hybrid electric control unit ("hybrid ECU") 66. The hybrid ECU 66 receives signals reflecting the driver's intention to, for example, accelerate or decelerate the vehicle expressed through operation devices, such as the ignition switch 68, the accelerator pedal 70, a brake pedal 72, and a shift lever 74. The hybrid ECU 66 also receives a signal from a vehicle speed sensor 76 that detects running speed of the vehicle. The signal from the vehicle speed sensor 76 may be replaced with the signal indicative of the rotational speed of the second motor 16 detected through the motor ECU 62.

The hybrid ECU 66 detects a request made by the driver based on the signals that correspond to the operation amount of the operation devices, respectively, such as the accelerator pedal 70 operated by the driver. At the same time, the hybrid ECU 66 determines the vehicle condition based on information from the ECUs 60, 62, 64, and vehicle speed sensor 76. Then the hybrid ECU 66 commands each of the ECUs 60, 62, 64 so that the vehicle is operated in a manner suitable for the vehicle condition and to satisfy the request from the driver. Further, the hybrid ECU 66 executes a control with respect to the moment-adding flywheel 42 based on the request from the driver and the vehicle condition.

The operation of the moment-adding flywheel 42 will be described in more detail. In the powertrain 10, the engine 12 is temporarily stopped if a predetermined condition to stop the engine 12 is met, for example, if the battery 50 does not need to be charged when the vehicle is temporarily stopped at a stoplight, or the vehicle is traveling at low speed and the fuel efficiency of the engine 12 is low. If a predetermined condition to restart the engine 12 is met, for example, if the vehicle speed reaches a predetermined speed from the aforementioned temporarily stopped state of the vehicle, the hybrid ECU 66 executes a control to restart the engine 12. The startup of the vehicle as described in the aforementioned case will be referred to as "restart" in order to distinguish the startup mentioned herein from a startup in response to the operation of an ignition switch 68. In the powertrain 10, the vehicle is restarted using the energy stored in the moment-adding flywheel 42 and the power output from the first motor 14.

If the hybrid ECU 66 determines that the condition to restart the engine 12 is met, the hybrid ECU 66 commands the engine ECU 60 and the motor ECU 62 to execute predetermined controls of the engine 12 and the motors, in particular, the first motor 14, respectively. At the same time, the hybrid ECU 66 controls the clutch 44 to be engaged in synchronization with the control of the engine 12 and the first motor 14. In this way, the hybrid ECU 66, the engine ECU 60, and the motor ECU 62 function as control portions that control the operation of the engine and the motors, and control the clutch so that the moment-adding flywheel 42 is connected and disconnected to and from the engine 12.

When the vehicle is driven by the engine 12 and/or the second motor 16, the hybrid ECU 66 disengages the clutch 44 if the acceleration request for the vehicle is made, for example, by depressing the accelerator pedal, in order to reduce the moment of inertia in the rotational system of the engine 12. In this way, the rotational speed of the engine 12 quickly increases, and accordingly, the output necessary for accelerating the vehicle can be generated with good response.

If the malfunction of the clutch 44 or the like occurs and thus the moment-adding flywheel 42 cannot be connected to the engine 12, the moment of inertia in the rotational system of the engine 12 remains small. In the normal operation, that is, when the moment-adding flywheel 42 is connected to the engine 12, the rotational system of the engine 12 has large moment of inertia. This reduces fluctuation in rotation of the engine 12. However, if the moment-adding flywheel 42 is not connected to the engine 12 and thus the moment of inertia remains small even when the moment-adding flywheel 42 needs to be connected to the engine 12, in particular, when the engine 12 is idling or is running at low rotational speed, vibration due to the fluctuation in rotation of the engine 12 and the like is increased. In the powertrain 10 according to the embodiment, when the moment-adding flywheel 42 cannot be connected to the engine 12, the rotational speed of the engine 12 is made higher than the speed at which the engine 12 is running in the normal operation, that is, when the moment-adding flywheel 42 is connected to the engine 12, so that the fluctuation in rotation is reduced.

Figure 2:
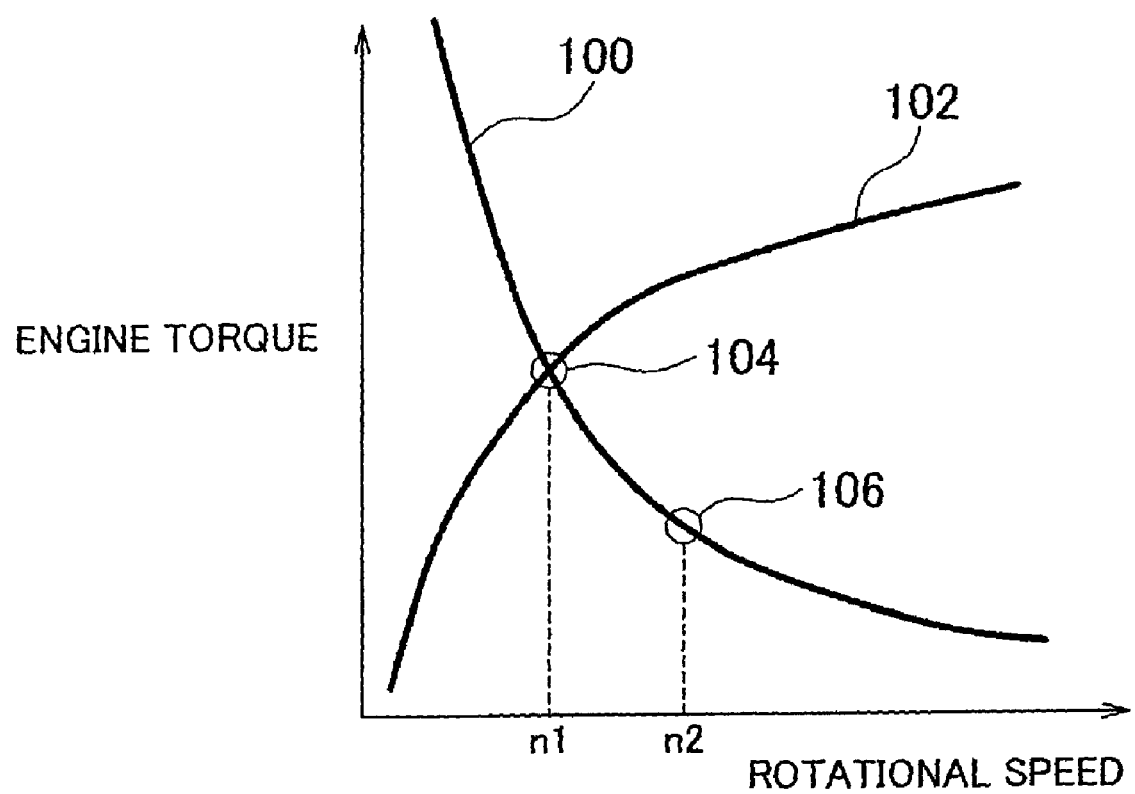
FIG. 2 is a view showing operational conditions (torque, rotational speed) used in a normal operation, and when a moment-adding flywheel cannot be connected.

FIG. 2 is a graph showing a relationship between the torque of the engine 12 and the rotational speed thereof. A curve 100 indicates the torque and rotational speed of the engine 12 when the output from the engine 12 is kept at a predetermined value, that is, the output from the engine 12 is the same at any point on the curve 100. A curve 102 is a curved line connecting best efficiency points at the respective rotational speeds when the output from the engine 12 is kept at the predetermined value. In the normal operation, a control is performed to select the best combination of the torque and rotational speed among the combinations that make it possible to achieve the required output, so as to achieve the best efficiency of the engine 12. That is, the engine 12 is operated with the torque and at the rotational speed indicated by an intersection point 104, which is a point at which the curve 100 indicating the required output intersects the curve 102 indicating the best efficiency. The rotational speed at the intersection point 104 is referred to as "n1". When the malfunction of the clutch 44 or the like occurs and the moment-adding flywheel 42 cannot be connected to the engine 12, a control is performed so as to achieve the torque and rotational speed n2 at a point 106 of which the rotational speed n2 is higher than the rotational speed n1. Note that, even if the engine 12 is operated at the point 106, because the point 106 is one point on the curve 100 indicating the same output, the output from the engine 12 equals to that in the normal operation.

When a malfunction in which the moment-adding flywheel 42 cannot be connected to the engine 12 occurs, the malfunction can be detected, for example, by monitoring and comparing the rotational speeds of the moment-adding flywheel 42 and the engine 12 detected by the rotational speed sensors 58, 52, respectively. That is, if the rotational speeds of the moment-adding flywheel 42 and the engine 12 do not match even when the control to engage the clutch 44 is being executed, it is determined that the malfunction in which the moment-adding flywheel 42 cannot be connected to the engine 12 is occurring.

In the powertrain 10, a control is executed to deal with a malfunction in which the moment-adding flywheel 42 cannot be disconnected from the engine 12 when disconnection is desired. If the moment-adding flywheel 42 remains connected to the engine 12, a large moment of inertia is kept in the rotational system of the engine 12. Therefore, response is deteriorated compared to that in the normal operation. In order to solve this, when restarting the engine 12, the torque of the first motor 14 for cranking may be increased so that the rotational speed of the engine 12 reaches a predetermined speed in the same amount of time as in the normal operation. Further, when the rotational speed of the engine 12 is increased, for example, when accelerating the vehicle, the output from the second motor 16 may be increased so as to compensate for decreases in response of the engine 12.

Furthermore, in order to generate the required output, the output from the engine 12 and the output from the second motor 16 may be controlled so that the ratio of the torque of the second motor 16 with respect to that of the engine 12 is higher than that in the normal operation, and the overall output is not changed.

In addition to the aforementioned cases, there may be a case where the rotational speed of the engine 12 is not increased to the required level due to deterioration in the response of the engine 12. Assuming such a case, the rotational speed of the engine 12 may be controlled so that the lower limit of the rotational speed of the engine 12 is set higher than that in the normal operation to shorten the time during which the rotational speed is increased to reach the target rotational speed.

It can be determined whether the malfunction in which the moment-adding flywheel 42 cannot be disconnected from the engine 12 occurs, by monitoring and comparing the rotational speeds of the engine 12 and the moment-adding flywheel 42. In other words, it can be determined that the malfunction occurs if the rotational speeds of the engine 12 and the moment-adding flywheel 42 change in unison even under the control to disconnect the moment-adding flywheel 42 from the engine 12.

The invention claimed is:

1. A vehicle powertrain, comprising:
an engine that drives a vehicle;
a flywheel that is selectively switched between a state where the flywheel is connected to an output shaft of the engine and a state where the flywheel is disconnected from the output shaft of the engine; and
a control portion that controls the engine, wherein
the control portion determines whether a malfunction of the flywheel occurs, and if it is determined that the malfunction of the flywheel occurs, the control portion controls the engine in accordance with a condition of the malfunction; and
the control portion controls the rotational speed of the engine to a value higher than the rotational speed in a normal operation, when a malfunction in which the flywheel is not connected to the output shaft of the engine occurs.

2. The vehicle powertrain according to claim 1, wherein the control portion determines that a malfunction in which the flywheel is not connected to the output shaft of the engine occurs, when the flywheel is controlled so as to be connected to the output shaft of the engine, and a rotational speed of the flywheel does not match a rotational speed of the output shaft.

3. The vehicle powertrain according to claim 1, wherein the control portion controls the engine so that an output from the engine equals to an output from the engine in a normal operation, when a malfunction in which the flywheel is not connected to the output shaft of the engine occurs.

4. The vehicle powertrain according to claim 1, further comprising:
a motor that drives the vehicle, wherein:
the control portion controls the motor;
the control portion controls the engine and the motor so that a ratio between a torque of the engine and a torque of the motor is a predetermined value in order to produce a required driving force for driving the vehicle; and
the control portion controls the engine and the motor so that a ratio of the torque of the motor to the torque of the engine is higher than that in a normal operation, when a malfunction in which the flywheel is not disconnected from the output shaft of the engine occurs.

5. A method for controlling a vehicle powertrain including an engine that drives a vehicle and a flywheel that is selectively switched between a state where the flywheel is connected to an output shaft of the engine and a state where the flywheel is disconnected from the output shaft of the engine, comprising:
determining whether a malfunction of the flywheel occurs; and
controlling the engine in accordance with a condition of the malfunction of the flywheel when it is determined that the malfunction of the flywheel occurs, wherein:
when a malfunction in which the flywheel is not connected to the output shaft of the engine occurs, the rotational speed of the engine is controlled to a value higher than the rotational speed in a normal operation.

6. The method according to claim 5, wherein when the flywheel is controlled so as to be connected to the output shaft of the engine, and a rotational speed of the flywheel does not match a rotational speed of the output shaft, it is determined that a malfunction in which the flywheel is not connected to the output shaft of the engine occurs.

7. The method according to claim 5, wherein when a malfunction in which the flywheel is not connected to the output shaft of the engine occurs, the engine is controlled so that an output from the engine equals to an output from the engine in a normal operation.

8. The method according to claim 5, wherein:
the vehicle powertrain further includes a motor that drives the vehicle, and a ratio of a torque of the motor to a torque of the engine is controlled to be higher than that in a normal operation, when a malfunction in which the flywheel is not disconnected from the output shaft of the engine occurs.

* * * * *